Figure 1:
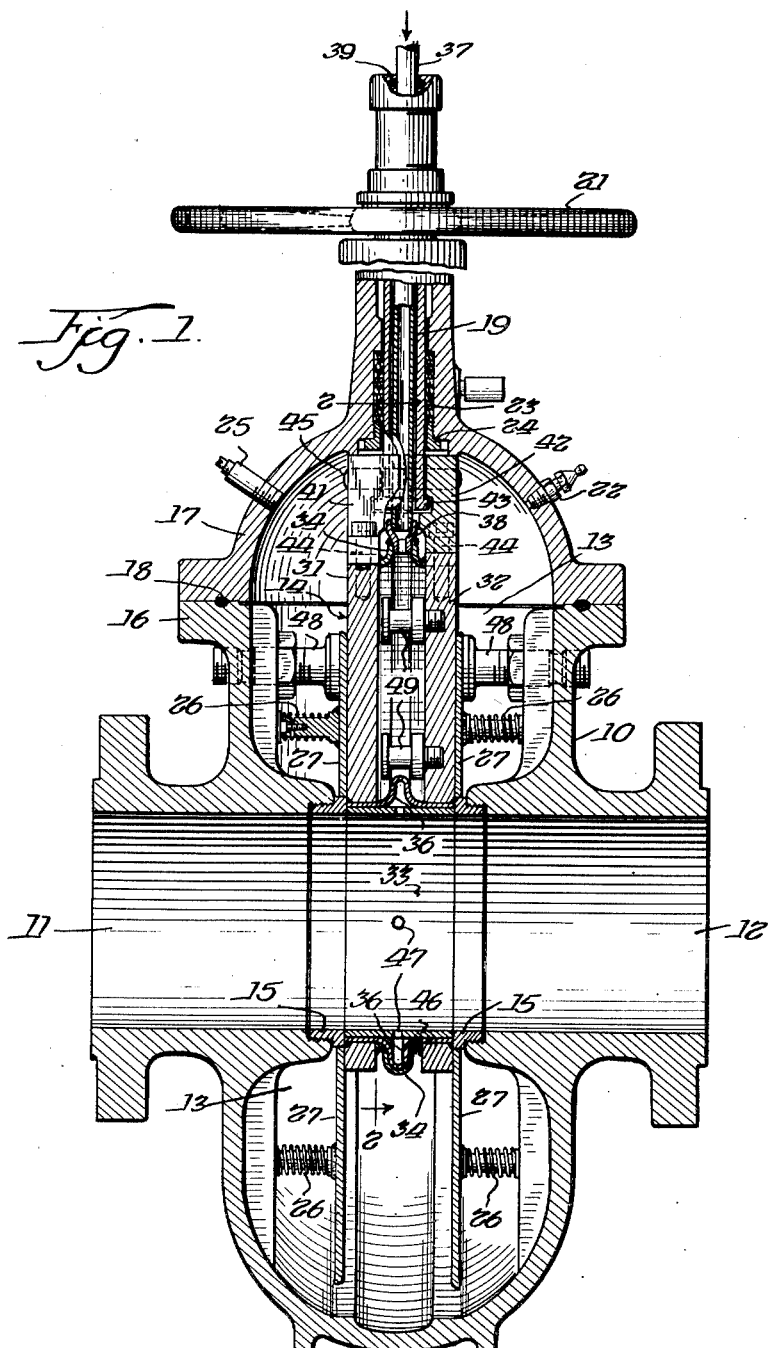

April 5, 1955

J. A. HJULIAN 2,705,610

CONDUIT VALVE

Filed May 5, 1951

2 Sheets-Sheet 2

Inventor.
Julius A. Hjulian.
By Joseph O. Lange

United States Patent Office 2,705,610
Patented Apr. 5, 1955

2,705,610

CONDUIT VALVE

Julius A. Hjulian, Palos Heights, Ill., assignor to Crane Co., Chicago, Ill., a corporation of Illinois Application May 5, 1951, Serial No. 224,790

3 Claims. (Cl. 251—175)

This invention pertains generally to gate valves, and, more especially, it pertains to a novel means of fluid tightly seating the closure plates of the gate valves including the type of valve commonly known as the conduit valve.

Conduit valves, which are usually considered to be a type of gate valve, are frequently employed in pipe lines where only a minimum of pressure drop, eddy current, and other flow impediments, are permitted to obtain desirable flow conditions. This type of valve is provided with a closure which in one position permits the complete closing off of fluid flow while a second position permits unimpeded flow through the valve. The latter feature is, of course, the distinguishing feature of the conduit valve as compared to other types of valve. Thus, the conduit valve is provided with a circular flow passage extending transversely through the closure thereof to align in the valve open position, with the inner diameter of the pipe to which the valve is connected. Obviously, the valve in the open position then acts as the pipeline itself in permitting flow to pass without the usual flow losses encountered in most valves.

In considering the operation of the conduit valve, it has long been a problem, however, to provide for the necessary seating force of the parallel closure plates in both the valve open and closed position. The construction of the conduit valve made to satisfy the operating conditions above referred to, preferably requires that a lubricant chamber be provided in the valve to communicate with the closure plates. Thus, in the reciprocal movement of the plates, lubricant is deposited on the plate faces and thereby provides for ease of valve operation as a lubricated contact exists between the plate faces and the adjacent guide plates.

It should be particularly noted that preservation of the lubricant requires the aforementioned fluid tight seating of the closure plates. Without a tight seating relation between the plate faces and the valve seats, objectionable flow impediments may be induced in the valve open position and leakage would occur in the valve closed position in addition to the objectionable possible action of the lubricant entering the line fluid.

With the foregoing comments, it should be apparent that it is highly desirable to construct a conduit valve with parallel closure plates having means for transversely moving said plates to seat the same. Heretofore, valve constructions providing the means for transversely moving the said plates have not been entirely satisfactory for all types of conduit valve service. In many of the presently known valve constructions, wedge means are employed to seat the plates, but have been found to be somewhat undesirable in that loose or free plates are required and frequently the wedge operates to bind the gate within the valve, thereby hampering valve operation, and it occasionally leads to breaking the valve stem due to overstressing the same.

In view of the foregoing, it is an important object of this invention to provide a gate closure member which is positively expanded and contracted within a valve body.

It is another important object of this invention to provide a conduit valve which comprises a means of tightly seating parallel closure plates in a set position of the valve gate, and providing for easy withdrawal of the said plates prior to reciprocating the said gate.

A further object of this invention is to provide a conduit valve which comprises a unitary gate member, thereby eliminating separate plates and wedges in the gate member.

Still a further object is to provide a conduit valve which positively expands and contracts the valve gate or closure member and thereby permits relatively easy operation of the valve in reciprocating the gate.

Other objects and advantages will become more readily apparent upon proceeding with the following description read in light of the accompanying drawings, in which, Fig. 1 is a fragmentary sectional assembly view of a conduit valve showing a preferred embodiment of this invention.

Figure 2:
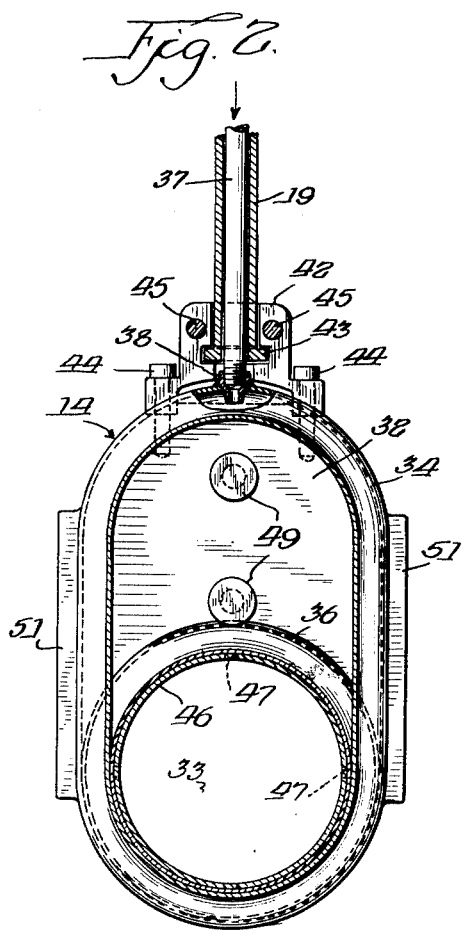

Fig. 2 is a sectional view of the gate shown in Fig. 1, as it is viewed from the line 2—2 of Fig. 1.

Similar reference numerals refer to similar parts throughout the several views.

As apparent in Fig. 1, a conduit valve, including a preferred embodiment of this invention, is shown to comprise a body section 10 having fluid openings 11 and 12 therein with an intermediate chamber. The end portions of the valve body 10 are, of course, formed for conventional attachment to pipe sections not shown. A central valve chamber 13 is provided within the body 10 to contain a lubricant while providing a housing for the gate or closure member 14 which will be hereinafter described in greater detail. A pair of oppositely disposed body seat rings 15 are preferably threaded into the body to surround the flow passage therethrough and effect a fluid tight seal therewith.

The upper end of the body 10 contains a flange 16 which is suitable for attaching thereto a bonnet 17 by means of bolts (not shown) by extending therethrough and compressing a gasket 18 retained by co-aligning annular grooves in the adjacent faces of the flange 16 and the bonnet 17. A journalling valve stem 19 is threadedly engaged through the bonnet 17 in a conventional manner with the upper end being attached to a handwheel 21 to impart rotation thereto. The opposite end of the stem 19 is suitably connected to the gate 14 to provide for reciprocal operation of the latter member by means of operation of the handwheel 21.

The bonnet 17 is provided with the usual lubricant feed screw fitting 22 which permits access into the bonnet and body chamber 13, while a pressure relief valve 25 also communicates between the chamber 13 and the valve exterior. An inner bore in the bonnet receives a packing material 23 and threaded gland 24 to insure a fluid tight seal about the stem 19.

A plurality of annularly spaced springs 26 are mounted within the body chamber 13 on both sides thereof to yieldingly urge a pair of annularly shaped guide plates 27 inwardly against the gate member 14. The plates 27 are concentrically mounted around the seat rings 15 to form a continuous guide surface for the reciprocal travel of the gate 14. Also, plates 27 serve to maintain the lubricant within the chamber 13.

The foregoing description pertains primarily to the conventional design of the conduit valve, while the following deals with the novelty of this construction. Thus, Fig. 1 further shows the gate member 14 to comprise a pair of parallel closure plates 31 and 32 preferably of the general configuration shown in Fig. 2. It will be noted that a transverse flow passage 33 is provided in the lower half of the gate extending through the plates 31 and 32 which are joined by an expansible fluid sealing means such as the bellows 34 which extends continuously around between the plates. In the preferred form shown in Fig. 1, the bellows 34 is welded to an inner circumference of the closure plates, while a second circular bellows 36 is also welded to the plates but extends around the flow passage 33. It should thus be apparent that a fluid pressure chamber exists between the bellows 34 and 36 intermediate the plates 31 and 32 whereby the gate 14 is expansible under suitable fluid pressure acting therewithin as applied from an external source in a manner hereinafter described. The respective faces of plates 31 and 32 are thereby tightly seated against seat rings 15.

The means for introducing fluid under pressure into the gate 14 is shown in Fig. 1 to comprise a conduit 37 which is positioned within an axial bore in the stem 19 to extend along the axis thereof and to communicate at the upper end with an external fluid source which is not shown. Obviously, the said fluid source can be a fluid pressure supply having a control valve to regulate the flow into the conduit 37 or it can be simply a fluid supply having a pump to produce the required pressure.

Also, a desirable means of obtaining fluid pressure for expansion of the gate member could comprise connecting the valve high pressure side with the interior of the gate and having a pressure booster device which will provide an internal pressure in excess of the line pressure. The latter mentioned device could be of a construction shown in a co-pending application, Serial No. 666,628, filed May 2, 1946, and now United States Patent Number 2,530,722, issued November 21, 1950. Thus, the pressure inside the gate member could be continuously relatively higher than line fluid pressure and automatically maintained at any desired differential pressure relation. Then, with an increase in line temperature and/or pressure, a corresponding increase in pressure will result within the gate member.

In the herein shown construction, conduit 37 extends downwardly through stem 19 to where it registers with the fluid chamber of gate 14 by means of a fitting 38 threaded onto the end thereof to extend through the bellows 34 to which it is shown welded. An O-ring 39 is preferably provided between the upper end of the conduit 37 and the stem 19 to prevent line fluid from escaping at that point.

It should thus be apparent that a means for selectively expanding the gate 14 is provided while release of pressure within the gate retracts the closure plates 31 and 32 to allow for easy reciprocal movement of the gate in operating the valve.

Mounted on the top of gate 14 is a connecting block having two half portions 41 and 42 which are engaged with stem head 43 and are secured to plates 31 and 32 by bolts 44. A plurality of transverse pins 45 are preferably provided to align block portions 41 and 42 together. Axial movement of stem 19 likewise moves conduit 37 and, of course, gate member 14 to control the flow through the valve.

To prevent turbulence through the valve when open, a cylinder 46 is relatively loosely disposed within the gate flow passage having a plurality of pressure equalizing openings 47 extending therethrough to avoid a surrounding low pressure condition tending to collapse bellows 36. Also, it is desirable to provide a plurality of supports 48 mounted within chamber 13 to abut guide plates 27 and thereby inwardly support plates 31 and 32 against canting under excess internal gate pressure. The inner faces of supports 48 are spaced to provide for expansion of the gate 14 to a distance corresponding to that between the seat rings 15. It is preferred to mount supports 48 so as to provide for adjustability by a means such as threading into the valve body 10.

Similarly, to prevent inward collapsing of the gate 14, a plurality of spacer members 49 are preferably threaded into the plate 32 to be positioned intermediate the plates 31 and 32, thereby providing for a minimum retracted distance between said plates. Thus, it should be apparent that line fluid pressure will not collapse the gate if the internal pressure thereof is relieved.

Although it is not shown in Fig. 1, it should be obvious that oppositely disposed guide ribs could be provided in the body 10 to project between the opposite edges of closure plates 31 and 32 (such as edges 51 shown in Fig. 2) which thereby form the guide groove on the gate 14. The gate is thus guided in a conventional manner in reciprocal movement during operation of the valve.

In view of the foregoing disclosure, it should be apparent that a simple and effective means has been devised to fluid tightly close a valve. As shown herein, this invention can be applied to numerous valve structures wherein a gate member is expanded by fluid pressure acting between a pair of oppositely disposed plates to force the latter outwardly against adjacent valve seats.

When applied to a conduit valve, it should be noted that the gate member is made unitary, thereby avoiding the usual multiple piece construction which has free or unattached plate member undesirably present for locking against adjacent members or the valve seat when under line pressure. This objectionable self-locking feature has frequently resulted in the breaking of many valve stems when valve operational forces are applied to overcome the locking force. In the present construction, obviously, no self-locking can take place as the gate is made in one piece, and the seating force is completely controlled by the regulation of the fluid pressure operating between the closure plates.

Although this invention has been described in specific forms, it is susceptible to changes, and should, therefore, be limited only by the spirit of this invention and the scope of the appended claims.

I claim:

1. A conduit valve gate member comprising a pair of spaced-apart ported plate members having a transverse fluid flow passage through a lower portion of each of said plate members, a continuous flexible connecting member fluid tightly joined to each of said plate members around an outer portion thereof, a second continuous flexible connecting member fluid tightly joined to each of said plate members around the said fluid flow passages to form a fluid chamber with said first-named connecting member within peripheral limits defined by said gate member, fluid pressure supply means in communication with said fluid chamber whereby said gate member is selectively expanded and contracted.

2. A conduit valve flexible gate member comprising a pair of spaced-apart ported plate members having a transverse fluid flow passage through a lower portion of each of said plate members, a bellows fluid tightly joined to each of said plate members to enclose a central portion thereof, a second bellows fluid tightly joined to each of said plate members annularly positioned between said first-named bellows encompassing said transverse flow passage on perimetral limits thereof to form a fluid chamber within said gate member, fluid pressure supply means in communication with said fluid chamber whereby said gate member is selectively expanded and contracted in response to variations in the said pressure supply.

3. A conduit valve comprising a valve body having fluid flow passages therethrough and a central chamber, seat rings mounted in said valve body to surround said flow passages, a flexible gate member disposed within said valve body chamber, said gate member comprising a pair of spaced apart plate members having a lower transverse opening on each of said plate members for substantial alignment with each other and with the said valve body flow passages in the valve open position, a bellows fluid tightly attached to said plate members, a second bellows fluid tightly attached to said plate member between said first-named bellows and said plate transverse openings to form a closed fluid chamber within perimetral limits defined by said gate member, fluid pressure supply means in communication with said chamber whereby pressure variations expand and contract said gate member, means connected to oppositely disposed spaced apart inner surfaces of the gate plate members for reciprocating said gate member within said valve body chamber to position said gate member with respect to said valve body flow passages and thereby selectively interrupt fluid flow through said valve.

References Cited in the file of this patent

UNITED STATES PATENTS

| | | |
|---|---|---|
| 2,176,594 | Nordstrom | Oct. 17, 1939 |
| 2,325,802 | Schmidt | Aug. 3, 1943 |
| 2,448,706 | Edwards | Sept. 7, 1948 |
| 2,476,711 | Edwards | July 19, 1949 |

FOREIGN PATENTS

| | | |
|---|---|---|
| 629,628 | Germany | 1936 |
| 711,187 | Germany | 1941 |